(12) United States Patent
Dewulf et al.

(10) Patent No.: US 10,586,953 B2
(45) Date of Patent: Mar. 10, 2020

(54) HIGH-CAPACITY STACKED-ELECTRODE METAL-ION ACCUMULATOR CAPABLE OF DELIVERING HIGH POWER

(71) Applicant: Commissariat a L'energie Atomique et aux Energies Altenatives, Paris (FR)

(72) Inventors: Frédéric Dewulf, Voiron (FR); Marianne Chami, Fontaine (FR)

(73) Assignee: COMMISSARIAT A L'ENGERGIE ATOMIQUE ET AUX ENERGIES ALTERTATIVES, Paris (FR)

( * ) Notice: Subject to any disclaimer, the term of this patent is extended or adjusted under 35 U.S.C. 154(b) by 183 days.

(21) Appl. No.: 15/819,513

(22) Filed: Nov. 21, 2017

(65) Prior Publication Data

US 2018/0145285 A1 May 24, 2018

(30) Foreign Application Priority Data

Nov. 23, 2016 (FR) ..................... 16 61413

(51) Int. Cl.
| | |
|---|---|
| *H01M 2/02* | (2006.01) |
| *H01M 10/0585* | (2010.01) |
| *H01M 4/48* | (2010.01) |
| *H01M 4/485* | (2010.01) |
| *H01M 10/0525* | (2010.01) |
| H01M 10/647 | (2014.01) |

(Continued)

(52) U.S. Cl.
CPC ....... *H01M 2/0257* (2013.01); *H01M 2/0285* (2013.01); *H01M 4/48* (2013.01);
(Continued)

(58) Field of Classification Search
CPC ............. H01M 2/0217; H01M 2/0257; H01M 2/0285; H01M 4/48; H01M 4/485;
(Continued)

(56) References Cited

U.S. PATENT DOCUMENTS

| | | |
|---|---|---|
| 2008/0057392 A1 | 3/2008 | Takamatsu et al. |
| 2014/0065464 A1* | 3/2014 | Masarapu ............. H01M 4/134 |
| | | 429/149 |

(Continued)

FOREIGN PATENT DOCUMENTS

| | | |
|---|---|---|
| EP | 2 933 865 | 10/2015 |
| JP | 2011/018585 | 1/2011 |

OTHER PUBLICATIONS

French International Search Report dated Apr. 13, 2017, in corresponding French Patent Application No. 1661413.

*Primary Examiner* — Amanda C. Walke
(74) *Attorney, Agent, or Firm* — Buchanan Ingersoll & Rooney PC (57) ABSTRACT

The present invention relates to a metal-ion accumulator (A), comprising a stack of elementary electrochemical cells, each comprising a cathode (2), an anode (3), and a separator (1) impregnated with electrolyte intercalated between the anode and the cathode, each anode and cathode consisting of a substrate (2S, 3S) formed from a metal foil comprising a central portion (22, 32) supporting, on at least one of its main faces, a layer of active metal ion insertion material, the porosity of the layers of active material of the electrodes of one of the given polarities (anode or cathode) having at least two different values in the stack, the highest porosity being that of at least one electrode of said polarity, arranged between the center and the ends of the stack.

17 Claims, 5 Drawing Sheets

(51) Int. Cl.
*H01M 10/613* (2014.01)
*H01M 10/654* (2014.01)
*H01M 4/02* (2006.01)

(52) U.S. Cl.
CPC ....... *H01M 4/485* (2013.01); *H01M 10/0525* (2013.01); *H01M 10/0585* (2013.01); *H01M 2/0217* (2013.01); *H01M 10/613* (2015.04); *H01M 10/647* (2015.04); *H01M 10/654* (2015.04); *H01M 2004/027* (2013.01); *H01M 2004/028* (2013.01)

(58) Field of Classification Search
CPC ........... H01M 10/0525; H01M 10/613; H01M 10/647; H01M 10/654; H01M 2004/027; H01M 2004/028

USPC .................................................... 429/231.95
See application file for complete search history.

(56) References Cited

U.S. PATENT DOCUMENTS

| | | | | |
|---|---|---|---|---|
| 2015/0162570 | A1* | 6/2015 | Ogg ..................... | H01M 10/26 429/163 |
| 2015/0270530 | A1* | 9/2015 | Thoennessen ........ | H01M 2/362 29/623.2 |
| 2016/0372780 | A1* | 12/2016 | Sohn .................... | H01M 4/131 |
| 2017/0125829 | A1* | 5/2017 | Fischel ................. | H01G 11/70 |
| 2018/0351145 | A1* | 12/2018 | Dewulf .................. | F16K 29/00 |
| 2019/0036185 | A1* | 1/2019 | McKay ................. | H01M 4/06 |

* cited by examiner

HIGH-CAPACITY STACKED-ELECTRODE METAL-ION ACCUMULATOR CAPABLE OF DELIVERING HIGH POWER

CROSS-REFERENCE TO RELATED APPLICATIONS

This application claims priority to French Patent Application 16 61413, filed on Nov. 23, 2016, which is incorporated herein by reference in its entirety for all purposes.

TECHNICAL FIELD

The present invention relates to the field of metal-ion electrochemical generators, which operate according to the principle of insertion or extraction, in other words intercalation and deintercalation, of metal ions in at least one electrode.

More particularly, it relates to a metal-ion electrochemical accumulator comprising a stack of elementary electrochemical cells, each comprising an anode, a cathode, and a separator impregnated with electrolyte intercalated between the anode and the cathode, two current collectors, of which one is connected to the anode and the other to the cathode, and a shell whose shape is elongated along a longitudinal axis, the shell being arranged to house the electrochemical cells in a sealed manner while allowing the passage of part of the current collectors forming the output terminals, also called poles.

The separator may consist of one or more films.

The shell may be flexible or rigid, forming a casing. The casing may comprise a lid and a container, usually called a pot, or may comprise a lid, a base and a lateral surround assembled onto the base and the lid simultaneously.

The present invention is intended to improve the heat dissipation and consequently the life of stacked-electrode metal-ion batteries, and in particular it is intended to provide high-capacity accumulators capable of delivering high power in high current conditions, typically between 2 C and 5 C.

Although it is described with reference to a lithium-ion accumulator, the invention is applicable to any metal-ion electrochemical accumulator, that is to say, equally, those of sodium-ion, magnesium-ion, aluminum-ion and other types.

PRIOR ART

Figure 1:
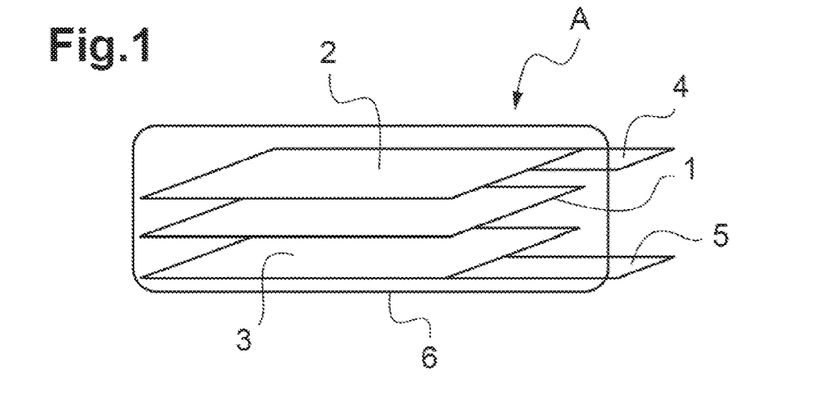
FIG. 1 is a schematic exploded perspective view showing the different elements of a lithium-ion accumulator.
Figure 2:
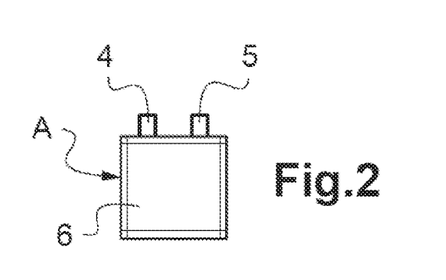
FIG. 2 is a face-on view showing a lithium-ion accumulator with its flexible shell according to the prior art.

As shown schematically in FIGS. 1 and 2, a lithium-ion battery or accumulator usually comprises at least one electrochemical cell C, formed by a separator impregnated with an electrolyte constituent 1, between a positive electrode or cathode 2 and a negative electrode or anode 3, a current collector 4 connected to the cathode 2, a current collector 5 connected to the anode 3, and finally a shell 6 arranged to contain the electrochemical cell which is sealed while allowing the passage of part of the current collectors 4, 5, forming the output terminals.

The architecture of conventional lithium-ion batteries is an architecture that may be described as monopolar, because it has only one electrochemical cell comprising an anode, a cathode and an electrolyte. There are a number of known types of monopolar architecture geometry:

a cylindrical geometry as disclosed in patent application US 2006/0121348,
a prismatic geometry as disclosed in the U.S. Pat. Nos. 7,348,098 and 7,338,733,
a stacked geometry as disclosed in patent applications US 2008/060189 and US 2008/0057392, and in the U.S. Pat. No. 7,335,448.

The electrolyte constituent may be in solid, liquid or gel form. In the last-mentioned form, the constituent may comprise a separator made of a polymer or microporous composite impregnated with organic or liquid-ion electrolyte(s), which allows lithium ions to move from the cathode to the anode for charging and in the reverse direction for discharging, thereby generating the current. The electrolyte is usually a mixture of organic solvents, for example carbonates to which a lithium salt, typically LiPF6, is added.

The positive electrode or cathode is composed of lithium cation insertion materials which are usually composite, such as lithium iron phosphate $LiFePO_4$, lithium cobalt oxide $LiCoO_2$, lithium manganese oxide, substituted if necessary, $LiMn_2O_4$, or a material based on $LiNi_xMn_yCo_zO_2$ where x+y+z=1, such as $LiNi_{0.33}Mn_{0.33}Co_{0.33}O_2$, or a material based on $LiNi_xCo_yAl_zO_2$ where x+y+z=1, $LiMn_2O_4$, LiNiMnCoO$_2$ or lithium nickel cobalt aluminum oxide $LiNiCoAlO_2$.

The negative electrode or anode is very commonly made of carbon, graphite or $Li_4Ti_5O_{12}$ (titanate material), and may also be based on silicon or lithium, or based on tin, or alloys of these, or a silicon-based composite. This negative electrode, like the positive electrode, may also contain electronic conductive additives, as well as polymer additives that provide it with mechanical properties and electrochemical performance appropriate to the application of the lithium-ion battery or to its method of use.

The anode and cathode made of lithium-containing insertion material may be continuously deposited by a common technique in the form of an active layer on a metal sheet or strip forming a current collector.

The current collector connected to the positive electrode is usually made of aluminum.

The current collector connected to the negative electrode is usually made of copper, nickel-plated copper, or aluminum.

Conventionally, a Li-ion battery or accumulator uses a pair of materials at the anode and at the cathode, enabling it to operate at a voltage typically between 1.5 and 4.2 Volt.

Depending on the intended application type, the aim is to provide either a thin, flexible lithium-ion accumulator or a rigid accumulator; the shell is then either flexible or rigid, and in the latter case it forms a kind of casing.

Flexible shells are usually made from a multi-layer composite material, consisting of a stack of aluminum layers covered by one or more polymer films laminated by bonding.

Figure 3:
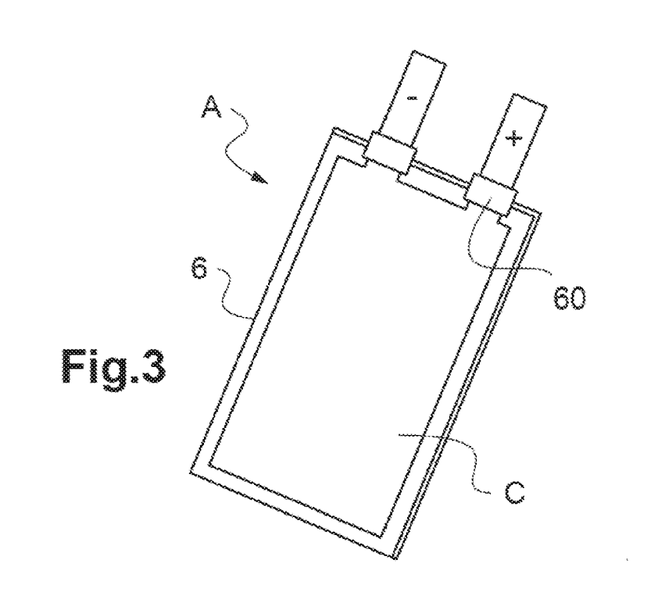
FIG. 3 is a perspective view of an example of a lithium-ion accumulator according to the prior art with its flexible shell.

FIG. 3 shows this type of flexible shell 6, which is arranged to contain the electrochemical cell C in a sealed manner, while allowing the passage of a part 40, 50 of each of two strips 4, 5 which form the poles and extend in the plane of the electrochemical cell. As shown in FIG. 3, polyolefin-based polymer reinforcers 60 may be provided to improve the hot sealing of the shell 6 around the strips 4, 5. The main advantage of flexible shells is their lightness. Li-ion accumulators with the highest energy densities therefore have flexible shells. The major drawback of these flexible shells is that their tightness is seriously degraded over time because of the lack of chemical strength of the sealing that is provided.

For their part, rigid shells are used when the intended applications are subject to stress where a long service life is desired, for example where very high pressures must be withstood and a stricter degree of sealing, typically less than $10^{-8}$ mbar·l/s, is required, or in highly stressed environments as in the aeronautical or spatial fields.

Thus the main advantage of rigid shells is their high degree of tightness which is maintained over time because the casings are sealed by welding, usually laser welding.

Figure 4:
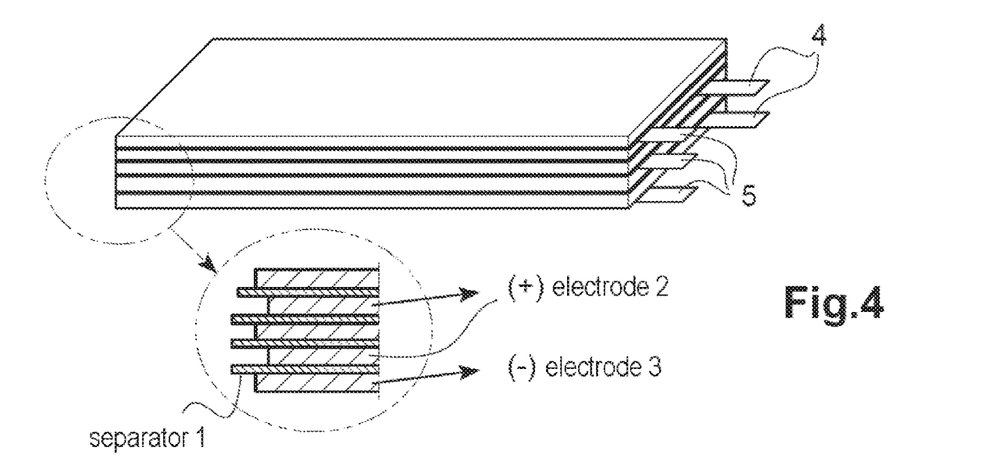
FIG. 4 is a perspective view of a stacked-electrode prismatic lithium-ion accumulator according to the prior art.

FIG. 4 shows schematically a Li-ion accumulator with an architecture consisting of stacked elementary electrochemical cells, each comprising a separator impregnated with an electrolyte constituent 1 intercalated between a cathode 2 and an anode 3. As may be seen in FIG. 4, the current collectors 4, 5 for the output of current are generally arranged on the same lateral side of the stack.

This stack, of prismatic shape, may be designed to be housed in a lateral shell of parallelepipedal shape 7 (FIG. 5) which forms part of a rigid casing, also of prismatic shape.

The main advantages of such a prismatic casing are:
  it allows heat dissipation on the faces of the stacked cells which have a large surface area, thus permitting an increase in the size of the electrodes, and consequently in the capacity of the cells;
  it can be easily integrated physically into a battery pack with a minimum of dead space, because of its flat faces.

Figure 6:
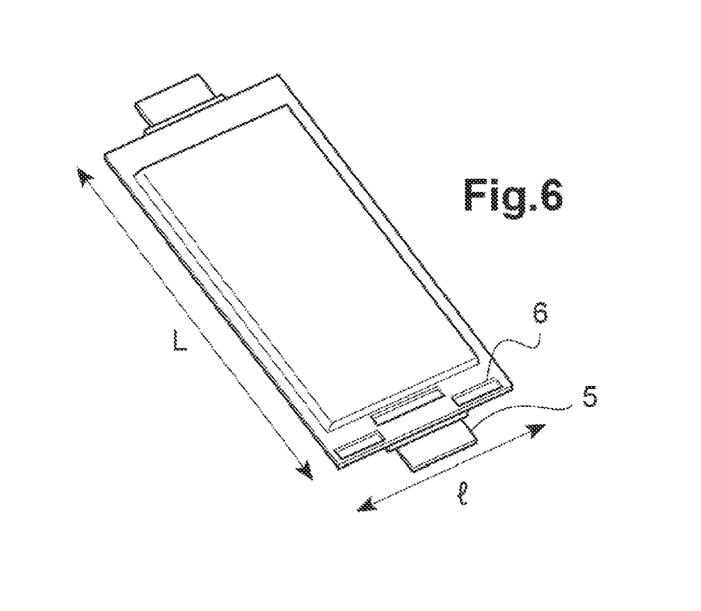
FIG. 6 is a perspective view of another example of a lithium-ion accumulator according to the prior art with its flexible shell, before its integration into a module forming a battery pack.

FIG. 6 shows a Li-ion accumulator with a stacked architecture of prismatic shape with a flexible shell 6, before it is integrated and assembled into a module forming a battery pack.

Figure 7:
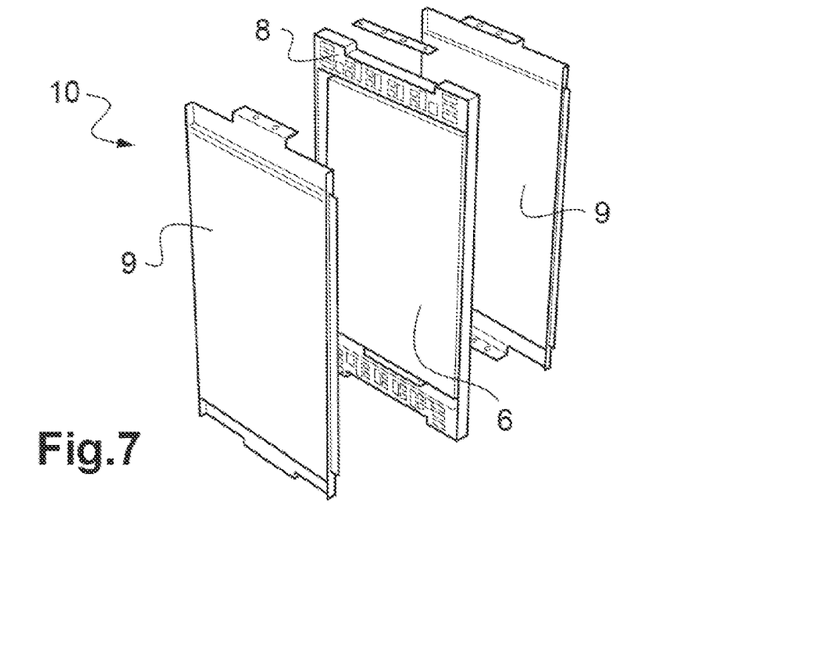
FIG. 7 is an exploded perspective view of a mechanical sub-assembly comprising an accumulator according to FIG. 6 before its assembly into a module forming a battery pack.

As shown in FIG. 7, such a stacked accumulator with a flexible shell 6 is initially secured in a rigid support 8 in the form of an open frame. When the accumulator has been secured, two mechanical reinforcement plates 9 are fixed on either side of the frame 8. These mechanical reinforcement plates 9 are designed to contain the stack when it increases in size due to the effect of the swelling of the usual electrodes. Thus a mechanical sub-assembly 10 is formed.

Figure 8:
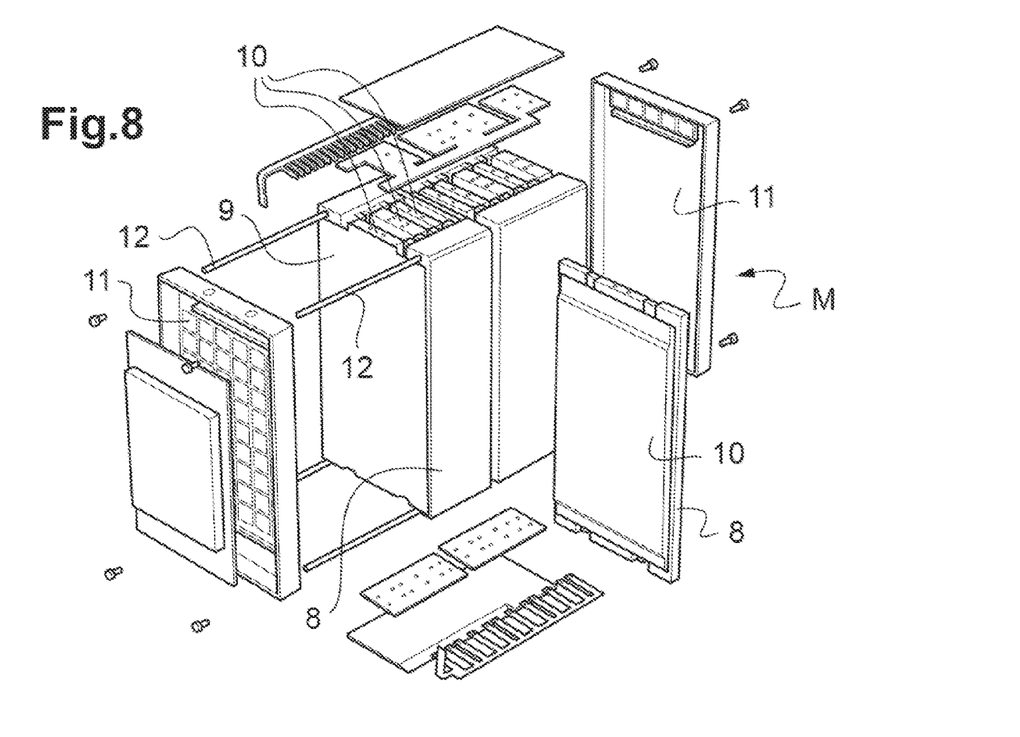
FIG. 8 is an exploded perspective view of a module forming a battery pack, in which a plurality of mechanical sub-assemblies according to FIG. 7 are assembled and held.
Figure 9A:
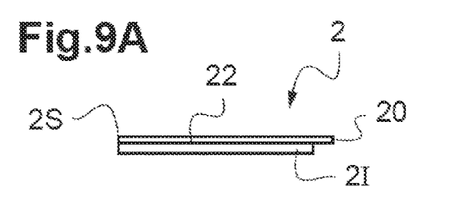
FIGS. 9A and 9B are, respectively, views from the side and the top of a positive electrode for use in a stacked prismatic accumulator according to the prior art.
Figure 9B:
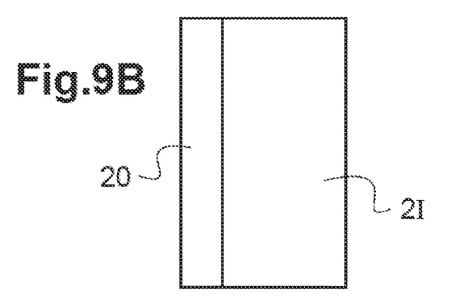
Figure 10A:
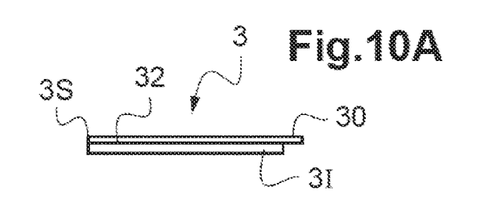
FIGS. 10A and 10B are, respectively, views from the side and the top of a negative electrode for use in a stacked prismatic accumulator according to the prior art.
Figure 10B:
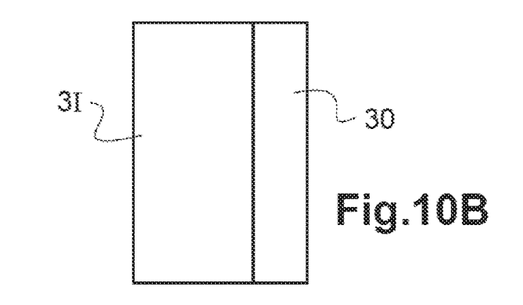

Then, as shown in FIG. 8, in order to produce a module M forming a battery pack, a plurality of mechanical sub-assemblies 10 are stacked together and framed on either side by enclosing plates 11, the mechanical sub-assemblies 10 and the enclosing plates 11 being finally assembled together by means of bolted rods 12.

This module M has the same advantages as those mentioned above for individual accumulators with prismatic casings.

Thus, among the designs for Li-ion accumulators, the prismatic geometry with stacked electrodes is found to be very useful for applications with high energy densities, because of its capacity for easy dissipation of the heat produced during operation.

FIGS. 9A and 9B and FIGS. 10A and 10B, respectively, show a positive electrode or cathode 2 and a negative electrode or anode 3, on the basis of which a stack of elementary cells, each comprising a separator 4 intercalated between the cathode 2 and the anode 3 is provided. The cathode 2 consists of a substrate 2S formed by a metal foil which supports, in its central portion 22, a continuous layer of active lithium insertion material 21, while its lateral strip (edge) 20 is free of active insertion material. Similarly, the anode 3 consists of a substrate 3S formed by a metal foil which supports, in its central portion 32, a continuous layer of active lithium insertion material 31, and its edge 30 is free of active insertion material. Each metal foil 2S, 3S is made in one piece, that is to say with the same geometrical and metallurgical characteristics over the whole of its surface.

The term "uncovered strip" or "edge" denotes, here and in the context of the invention, a lateral portion of a metal sheet metallic, also called a foil, forming a current collector, which is not covered with a material for the insertion of metal ions, such as lithium in the case of a Li-ion accumulator.

These electrodes 2, 3 for Li-ion accumulators are usually produced by a continuous process using a technique of coating the active insertion material onto the metal foil to form the active continuous layer. These coating techniques are known by the English terms "slot die" or "roll to roll transfer".

Although they are satisfactory in many respects, stacked-electrode Li-ion accumulators of prismatic shape, particularly those of high capacity capable of delivering high power, give rise to major problems of heat dissipation, due to their intrinsic design.

This is because, as explained below and highlighted by research findings, when they operate with a flow of current in charging or discharging, heating occurs within stacked-electrode prismatic Li-ion accumulators.

Reference may be made, in the first place, to publications [1] and [2] which study the effect of the type of design of stacked-electrode Li-ion accumulators with prismatic geometry.

In particular, publication [2] discloses the effect of the dimensions, namely the width, height and thickness, of a stacked-electrode prismatic Li-ion accumulator.

In this publication [2], the thermal behavior of four prismatic accumulators with different formats is studied. The disclosed results show that the accumulator that is smallest, and therefore has a low capacity, has better heat dissipation.

Conversely, as soon as a higher-capacity prismatic accumulator is planned, it must preferably have a large surface area and the smallest possible thickness, to prevent the accumulation of heat in the core of the stack.

This publication [2] therefore makes it clear that relatively thin accumulators with large surface areas provide better heat dissipation.

In view of this, with the currents involved typically being at a rate of more than 2 C, the position of the connections becomes crucial, and such accumulators require the use of wide current collector connections arranged on the longitudinal edges of the stack, opposite one another, in order to optimize the flow of electrons and thus prevent the regions close to the connections from being stressed more than the rest of the accumulator.

It should be noted here that, as usually defined, a rate of 1 C signifies a current value equal to 1 times the nominal capacity of the accumulator. Thus, for a 10 Ah accumulator, a discharge at a rate of 1 C signifies that discharging is taking place with a current of 10 A.

The configuration of the arrangement of the connections opposite one another with respect to the surface of the stack of an accumulator has consequences when it is desired to produce a battery, usually called a battery pack, by assembling a plurality of stacked prismatic accumulators, electrically connected in series or in parallel with one another.

This is because, in this configuration, two areas inside the battery must be left free to provide the electrical links of the +/− connections between accumulators. This configuration may then be more space-consuming, thereby reducing the energy density per unit of volume (in Wh/liter) of the battery as a whole.

At the present time, for applications requiring not only the energy to provide long life but also high power, use is most often made of an assembly of accumulators having a high energy density but smaller dimensions, and therefore lower capacity.

These accumulators of small dimensions have a high internal resistance. It is then necessary to place a significant number of accumulators, typically with a factor of 20 to 50 times, in parallel, in order to obtain a quantity of energy equivalent to that which would be provided by an assembly of accumulators having larger dimensions and therefore higher capacity.

In other words, it would be much more useful, for the design of a battery pack having the same level of energy, to use stacked prismatic accumulators with large dimensions, large surface areas and higher capacities, by increasing the total thickness of each accumulator and having the connections arranged on the same side of each accumulator, so as to concentrate all the connections between accumulators inside the battery pack in the same area, preferably on a single face.

The inventors have conducted comparative tests to demonstrate the usefulness of this solution, but also the limitations that exist on the use of present-day accumulators with a high total thickness, because of the heating that they create.

The tests were conducted on stacked prismatic accumulators of the lithium-polymer type, marketed under the trade name SLPB by the Korean company Kokam.

Two groups of accumulators were compared:
the first group, hereinafter referred to as group 1, contains accumulators marketed under the trade reference "SLPB xxx 460330", with a posted capacity of 100 Ah to 240 Ah, having a total thickness of 7 mm to 16 mm.
the second group, hereinafter referred to as group 2, contains accumulators marketed under the trade reference "SLPB xxx 216216", with a posted capacity of 25 Ah to 53 Ah, having a total thickness of 6 mm to 12 mm.

Table 1 below summarizes the different dimensional and weight characteristics, together with the calculation of the ratio between thickness and surface area for each accumulator of groups 1 and 2.

It should be noted that all the accumulators are housed in flexible shells.

TABLE 1

| Group | Trade reference | Capacity (Ah) | Energy (Wh) | Width (mm) | Length (mm) | Surface area S (mm$^2$) | Thickness E (mm) | Volume (l) | Ratio E/S (·m$^{-1}$) |
|---|---|---|---|---|---|---|---|---|---|
| 1 | SLPB70460330 | 100 | 370 | 462 | 327 | 151074 | 7 | 1.06 | 0.0463 |
|   | SLPB120460330 | 150 | 555 |   |   |   | 10.5 | 1.59 | 0.0695 |
|   | SLPB140460330 | 200 | 740 |   |   |   | 13.7 | 2.07 | 0.0907 |
|   | SLPB140460330 | 240 | 888 |   |   |   | 15.8 | 2.39 | 0.1046 |
| 2 | SLPB60216216 | 25 | 92.5 | 226 | 227 | 51302 | 6.3 | 0.32 | 0.1228 |
|   | SLPB90216216 | 40 | 148 |   |   |   | 9.3 | 0.48 | 0.1813 |
|   | SLPB120216216 | 53 | 196.1 |   |   |   | 12 | 0.62 | 0.2339 |

This table shows that the thickness/surface (E/S) ratio is about three times greater for the accumulators of group 1 than for those of group 2.

In adiabatic conditions, the relation between the thermal energy evolved and the energy produced by the Joule effect when current flows in an accumulator is as follows:

$$m.\times Cp\times dT = R.\times I^2 \times t \quad (1)$$

in which m represents the weight of the accumulator, in grams,

Cp represents the specific heat or mean heat capacity of the set of constituents of the accumulator (in J/g.° C.), dT represents the variation in temperature, R represents the internal resistance of the accumulator, in mOhm, I represents the value of the current flowing through the accumulator, in amperes, and t represents time.

After experimental verification, it is considered that the electrochemical nature and proportion of the constituents of the Li-ion accumulators are equivalent, regardless of whether the group is group 1 or group 2.

A value Cp of specific heat which is constant for both groups 1 and 2 may therefore be used in formula (1) above.

From this we deduce the following expression for the determination of the temperature variation when there is a flow of current:

$$dT = 1/Cp \times (RI^2/m) \times t.$$

Assuming that the value Cp of specific heat is virtually constant for all formats of the same electrochemistry, it may be estimated that, for a given time interval (t), the temperature variation (dT) is directly proportional to the ratio (RI$^2$/m).

Table 2 below summarizes the calculation of the heating factor RI$^2$/m for each accumulator of groups 1 and 2 considered in the table above.

TABLE 2

| Group | Trade reference | Weight (kg) | Internal resistance (mOhm) | Rate, C | Direct current (amperes) | Power dissipated by Joule effect, $RI^2$ (W) | Factor $RI^2/m$ (·$m^{-1}$) |
|---|---|---|---|---|---|---|---|
| 1 | SLPB70460330 | 2.07 | 0.65 | 1 | 100 | 6500 | 3140 |
|   | SLPB120460330 | 3.21 | 0.5 |   | 150 | 11250 | 3505 |
|   | SLPB140460330 | 4.18 | 0.5 |   | 200 | 20000 | 4785 |
|   | SLPB140460330 | 4.78 | 0.5 |   | 240 | 28800 | 6025 |
| 2 | SLPB60216216 | 0.6 | 1.2 | 1 | 25 | 750 | 1250 |
|   | SLPB90216216 | 0.9 | 0.9 |   | 40 | 1440 | 1600 |
|   | SLPB120216216 | 1.16 | 0.9 |   | 53 | 2528 | 2179 |

On the basis of the data of Tables 1 and 2, it is possible to plot the respective curves of the heating factor ($RI^2/m$) as a function of the thickness/surface (E/S) ratio, for each of the two groups 1 and 2.

Figure 11:
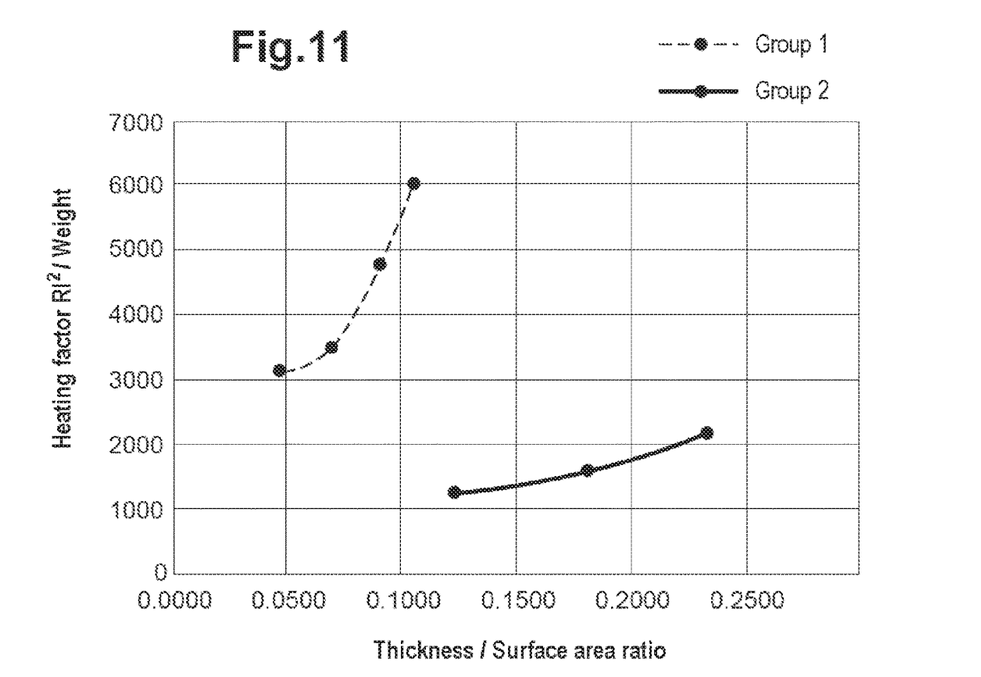
FIG. 11 shows, in the form of curves, the heating factor as a function of the thickness to surface ratio of two groups of stacked prismatic accumulators according to the prior art.

These curves are shown in FIG. 11.

Examining these curves, it will be seen that, for an equivalent current flow rate 1 C, that is to say with a similar current density for both groups 1 and 2 of accumulators, group 2, i.e. the one having the smaller surface area and therefore a higher E/S ratio, exhibits a smaller variation in the heating coefficient.

This tendency is present when the thickness of the accumulator, and therefore of its constituent stack of electrodes, increases (with a rising E/S ratio), by comparison with group 1 which has the larger surface area.

It should be noted here that, if adiabatic conditions are no longer present for accumulators having small surface areas, the argument remains true when the heating factor is maximized.

This difference in behavior confirms that accumulators having larger surface dimensions (group 1), for which the thermal conditions are close to adiabatic conditions, are preferably used at low current rates, typically, below 2 C, by contrast with accumulators having smaller dimensions (group 2) which may meet the requirements of higher currents, typically reaching 3 C to 5 C or even more when used for power applications.

To summarize, stacked-electrode prismatic Li-ion accumulators, and more generally metal-ion accumulators, notably those with high capacity, are subject to limits in their design.

A first design limit is a large thickness, because, above a certain value of thickness, localized heating occurs, causing reduced life and lower performance, with, notably, a high risk of electrical and safety malfunction. This localized heating is directly dependent on the ionic resistance part of the electrochemical cell and on the limit conditions constraining the discharge of the evolved thermal power.

A second limit is a large surface area, because, above a certain value of surface area, the current flow rate must be reduced to avoid the occurrence of heating in the internal connections.

In fact, in stacked accumulators with large surface areas, the current lines provided from the periphery of the electrodes to the external connections are longer: since the electrons have a greater distance to cover, the electronic resistance is therefore greater.

The proportion of electronic resistance in the overall internal resistance of the accumulator is thus preponderant in heating.

There is consequently a need to improve the life and performance of lithium accumulators, and more generally metal-ion accumulators, notably those of high capacity, which are formed by stacking electrodes.

In particular, there is a need to improve the heat dissipation in lithium accumulators, and more generally in metal-ion accumulators, notably those of high capacity, in order to deliver high power at high current rates, typically between 2 C and 5 C.

The object of the invention is to provide at least a partial response to this requirement or these requirements.

SUMMARY OF THE INVENTION

For this purpose, the invention, in one of its aspects, relates to a metal-ion accumulator comprising a stack of elementary electrochemical cells, each comprising a cathode which is an electrode of positive polarity, an anode which is an electrode of negative polarity, and a separator impregnated with electrolyte intercalated between the anode and the cathode, each anode and cathode consisting of a substrate formed from a metal foil comprising a central portion supporting, on at least one of its main faces, a layer of active metal ion insertion material, the porosity of the layers of active material of the cathodes or the anodes having at least two different values in the stack, at least one of the cathodes or the anodes having the highest porosity being arranged between the center and the ends of the stack.

Thus the invention essentially consists in adapting the porosity of a layer of active insertion material of electrodes of a given polarity (anode or cathode) on the basis of its position in the accumulator stack.

This possibility of higher porosity in electrodes of a given polarity can facilitate current drainage at a high rate, typically between 2 C and 5 C max., in the central part (core) of the prismatic accumulator stack, which will help to limit the proportion of the ionic resistance in this central part and consequently reduce the proportion of the energy generated by the Joule effect in the center of the accumulator.

Thus better heat dissipation may be obtained throughout the whole accumulator stack.

In the application of the invention, it is evidently necessary to comply with the design rules which require that for each unit of surface area there must always be an excess of negative active material over positive active material based on metal which is lithium in the case of a Li-ion accumulator.

If the limit thermal conditions at the top and bottom end faces of the accumulator are symmetrical, the stack of electrodes in the total thickness of the accumulator must preferably be symmetrical with respect to the center of the stack, to ensure a good degree of uniformity for the evolution of energy generated by the Joule effect. Heat dissipation can thus take place in an equivalent manner on the two large faces of the prismatic accumulator according to the invention.

Conversely, if the limit thermal conditions are non-symmetrical, the stack may preferably be non-symmetrical with respect to the center of the stack, again with the aim of providing a good degree of thermal uniformity.

As a result of the invention, it is thus possible to provide stacked accumulators in formats which are normally used for high capacities that can deliver high power, without the risk of developing excessive localized heating which would degrade the service life.

In other words, by adapting the thickness and the weight per unit area of the active layers of the electrodes on the basis of their position in the stack, it is possible to access prismatic accumulator formats having greater capacity that can deliver higher power at high current rates than those of the prior art, while maintaining a high level of energy density.

Typically, for surface areas equivalent to those of commercial accumulators, such as those of groups 1 and 2 shown in Tables 1 and 2 above, by increasing the total thickness of the stacked electrodes by about +5% to +10% maximum, but distributing it with the different electrode porosities, according to the thermal conditions within the stack, it is possible to produce very high-capacity prismatic accumulators that can deliver high power at high current rates, typically between 2 C and 5 C.

To summarize, the advantages provided by the invention are numerous, and include the following:

- the possibility of operating a prismatic accumulator according to the invention at current rates greater than those of prior art stacked accumulators, with an equivalent surface area and an equivalent total thickness. This possibility results from a greater capacity to dissipate the energy generated in the charging and discharging phases;
- better impregnation of the electrolyte, compared with prior art stacked accumulators. This is because the increased porosity of the electrodes of one polarity in some layers of active material allows a reserve of electrolyte to be provided in the central part of the accumulator stack, which helps to ensure better electrolyte impregnation at the start of service life from the outside to the core of the accumulator, together with the continued wettability of the electrodes which is extended in the period of the life cycle of the accumulator in use;
- less heating of the accumulator in operation at high power. The layers of the most porous active materials, that is to say those better impregnated by the electrolyte, facilitate the transfer of metal ions, such as lithium ions, by the flow of the electrolyte. In other words, ion diffusion is facilitated and electronic resistance is decreased. This causes a decrease in the internal resistance to ion conduction, which will improve the capacity for a stronger current flow in the accumulator. Consequently, for an equivalent current (or equivalent power) applied to a prior art accumulator, such as those described in Tables 1 and 2, an accumulator according to the invention gives off less heat, because of its lower ionic resistance;
- an improvement in the service life. Thus the decrease in the temperature range produced, both between the start and the end of charging and between the start and the end of discharging, will slow down the electrochemical ageing normally seen in prior art Li-ion accumulators, in different areas on the surfaces of the electrodes or of the separator, such as heating areas, electrolyte drying areas, lithium deposition areas, etc. Consequently, the number of charge/discharge cycles that can be achieved up to the normal end-of-life point, typically reached at 80% of the initial start-of-life capacity, will be increased for an accumulator according to the invention. The inventors consider that, in terms of the cumulative number of charges and discharges in Wh, the gain may be as much as +20% relative to a number of cycles that can usually be achieved with a prior art accumulator;
- the possibility of gains in weight and volume for module or battery packs comprising a plurality of accumulators according to the invention, connected in series or in parallel with one another. This is because, the increased porosity of the layers of active material of some of the electrodes of one polarity will increase the total thickness of these electrode layers, thereby increasing the total thickness of an accumulator according to the invention, by comparison with a prior art accumulator such as those shown in Tables 1 and 2 in the preamble. The inventors consider that the resulting relative increase in total thickness and therefore in overall volume may be about +5% to +10%. This increase is manifested in a loss of energy per unit volume in Wh/liter of −5% to −10%, the energy density per unit weight Wh/kg remaining virtually stable (with a loss considered to be less than −2%).

However, the design of an accumulator according to the invention will ultimately make it possible to simplify the internal assembly of a plurality of accumulators and thus achieve a gain in energy density per unit volume (Wh/L) and energy per unit weight (Wh/g) in a normal configuration of a type xS yP battery module (where xS is the number X of accumulators connected in series and yP is the number Y of accumulators connected in parallel), for the following reasons. By introducing electrodes which are more porous than usual into the accumulator, a volume is left free which is greater than the volume occupied by all the metal ions, such as lithium ions in Li-ion technology, which will be inserted into the thickness of the more porous layers. The mechanical stresses in the thickness of the electrodes of higher porosity will therefore be reduced, and the thickness of these more porous electrodes will increase to a very small extent during the cycling of the accumulator. On the other hand, other layers of electrodes of the same polarity which are less porous will attempt to become thicker during the cycles of insertion (in charging) and extraction (in discharging) of the metal ions. This variation in thickness will create mechanical stresses and compression phenomena within the stack of electrodes as a whole. Conversely, the more porous electrodes will be able to absorb some of these compressive forces and thus reduce the effect of thickening of the stack as a whole. In other words, the layers of active material with higher porosity according to the invention improve the mechanical behavior of the stack.

More particularly, where prismatic accumulators with flexible shells are assembled into a module, this mechanical improvement may result in the elimination of the metal reinforcement plates usually provided to compensate for the compressive effect caused by the large increase in stack volume in prior art accumulators. Typically, with reference to the assembly shown in FIGS. 7 and 8 which were described in the preamble, it is possible to dispense with the use of reinforcement plates 9 in accumulators according to the invention. The elimination of these reinforcement plates which are usually intercalated between two adjacent accumulators to form the module M will make it possible to free some of the volume inside the module. The inventors consider that the gain in free volume may be about +5% to +15%, indicating a significant reduction of the total weight of a module M in inverse proportions of about −5% to −15%.

To summarize, with accumulators according to the invention with flexible shells in a configuration of the type shown in FIG. 6, it is feasible to compensate for a reduction in the energy density per unit volume at the scale of an accumulator, estimated at −5% to −10%, by a simplification of the design of a module in which a plurality of accumulators is assembled. This leads to a gain in weight and volume resulting in a gain in energy density per unit volume (Wh/L) and in energy density per unit weight (Wh/kg) which may reach +10% in some cases. Finally, this simplified construction of the battery module may also have a non-negligible effect on the overall cost of a battery pack solution.

Figure 5:
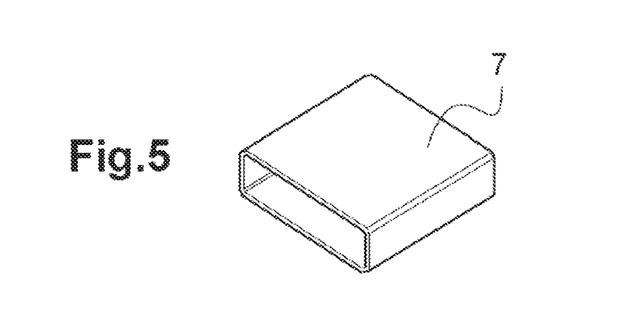
FIG. 5 is a perspective view showing a rigid casing to house a prismatic accumulator according to FIG. 5.

The advantages and conclusions set out above for a module with accumulators with flexible shells are also applicable to accumulators according to the invention having a prismatic geometry, housed in a rigid casing such as the casing 7 shown in FIG. 5. This is because, for assembly into a module, reinforcement plates are usually also intercalated between adjacent rigid casings, for the purpose of both stiffening the whole module and absorbing any variations in thickness of the accumulators during cycling. Thus, when accumulators with differentiated porosity according to the invention, housed in rigid casings of prismatic shape, are assembled into a module, it will be possible at least to reduce, or even to eliminate, the plates intercalated during the construction of the module.

According to an advantageous characteristic, the lowest porosity is 33% and 36%, while the highest porosity is between 39% and 45%.

According to an advantageous embodiment, the thickness of the layers of active material of the electrodes of the same polarity (anode or cathode) has at least two different values within the stack, the smallest thickness being that of the electrodes in the center of the stack, with the exception of the thickness of the layers of electrodes having the higher porosity.

Thus the thickness of active insertion material is reduced, with the exception of the more porous layers in the areas that may be subject to significant thermal conditions during the life of the accumulator.

The areas most affected by these most stressful thermal conditions are those toward the center of the stack.

As the electrode surface area, and therefore the active insertion material surface area, increases, progressive variations in the electrode thickness are increasingly encountered. Typically, depending on the desired characteristics of the accumulator, 12 to 15 different levels of thickness may be provided for accumulators having a total thickness of about 20 mm.

The thicknesses of the active layers of the negative and positive electrodes preferably increase or decrease in an identical way according to their location in the stack, with the exception of the layers of higher porosity.

According to an advantageous variant, the lowest porosity of the layers of active material of the negative electrode is between 28% and 36%, while the highest porosity is between 37% and 45%.

According to another advantageous variant, the lowest porosity of the layers of active material of the positive electrode is between 21% and 31%, while the highest porosity is between 32% and 42%.

Advantageously, the thickness of the layers of active material of the electrodes of the same polarity (anode or cathode) has at least two different values within the stack, the smallest thickness being that of the electrodes in the center of the stack, with the exception of the thickness of the layers of electrodes having the higher porosity.

The electrodes having the highest porosity are preferably negative electrodes.

According to an advantageous variant, the variation in thickness of the negative electrodes and/or the positive electrodes between the center and the ends of the stack is between 20 and 200 μm.

Preferably,
the layer of active material of the negative electrodes at the end of the stack has a thickness of more than 150 μm;
the layer of active material of the negative electrodes in the center of the stack, with the exception of the layer of active material of the electrodes of higher porosity, has a thickness of less than 150 μm;
the layer of active material of the positive electrodes at the end of the stack has a thickness of more than 225 μm;
the layer of active material of the positive electrodes in the center of the stack has a thickness of less than 225 μm;

The electrode foil may advantageously have a thickness of between 10 and 20 μm. The foil may be made of aluminum or copper.

According to a particularly advantageous embodiment, the accumulator may comprise two groups of negative and positive electrodes of lower porosity and a group of electrodes having the highest porosity, the thickness of the layers of active material of the same polarity differing between the two groups of lower porosity, the first group of electrodes of lower porosity being arranged at the ends of the stack and the second group of lower porosity being arranged in the center of the stack, with at least one negative electrode of the group of higher porosity intercalated into the second group of lower porosity.

The invention also relates to the use of the accumulator described above for applications of the power type corresponding to current rates which are typically between 2 C and 5 C.

Finally, the invention relates to a metal-ion battery or accumulator, such as a lithium-ion (Li-ion) accumulator as described above, having a flexible shell or a rigid casing in which the stack is housed.

Preferably,
the casing is aluminum-based;
the metal foil of the negative electrode(s) is made of copper;
the active insertion material of the negative electrode(s) is chosen from the group comprising graphite, lithium, and titanate oxide $Li_4Ti_5O_{12}$; or is based on silicon or lithium, or based on tin and alloys thereof;
the metal foil of the positive electrode(s) is made of aluminum;
the active insertion material of the positive electrode(s) is chosen from the group comprising lithium iron phosphate $LiFePO_4$, lithium cobalt oxide $LiCoO_2$, lithium manganese oxide, substituted if necessary, $LiMn_2O_4$, or a material based on $LiNi_xMn_yCo_zO_2$ where $x+y+z=1$, such as $LiNi_{0.33}Mn_{0.33}Co_{0.33}O_2$, or a material based on $LiNi_xCo_yAl_zO_2$ where $x+y+z=1$, $LiMn_2O_4$, $LiNiMnCoO_2$ or lithium nickel cobalt aluminum oxide $LiNiCoAlO_2$.

DETAILED DESCRIPTION

Other advantages and characteristics of the invention will be more apparent from a perusal of the detailed description of examples of embodiment of the invention, provided by way of non-limiting illustration, with reference to the following drawings, in which.

For the sake of clarity, the same references denoting the same elements of a prior art lithium-ion accumulator according to the prior art and according to the invention are used for all the figures from 1 to 12.

It should be noted that the different elements according to the invention are shown solely for the sake of clarity and that they are not to scale.

It should also be noted that the terms "length" and "lateral" relating to an electrode refer to the electrode in the flat state.

The terms "above" and "below" relating to a stacked-electrode prismatic accumulator are to be considered in a flat configuration with the electrode surfaces lying horizontal and the end faces at the top and at the bottom respectively.

FIGS. 1 to 11 have already been described in detail in the preamble. Consequently they are not described below.

As detailed in the preamble, the inventors have found that a high-capacity Li-ion accumulator, as it is formed at present by stacking electrodes, has limitations on its design.

On one hand, it is difficult to see how to increase their total thickness beyond a certain limit in order to increase the amount of energy for a given surface. This is because localized heating may occur, with a high risk of electrical and safety malfunctions.

Such heating is directly related to the ionic resistance part of the accumulator and to the limit conditions constraining the discharge of the evolved thermal power.

On the other hand, the increase in the surface area of the electrodes beyond a certain limit makes it necessary to reduce the current flow rate.

This is because, in the case of electrodes with large surface areas, the current lines provided from the periphery of the electrodes to the external connections are longer: the electrons have a greater distance to cover, and the electronic resistance is therefore greater.

Consequently the heating that occurs is directly related to the electronic resistance part of the overall internal resistance of the accumulator.

Consequently, in order to overcome these drawbacks and to be able to propose higher-capacity stacked Li-ion accumulators capable of delivering high power at high current rates, typically of between 2 C and 5 C, the inventors propose an adaptation of the porosity of the layers of active material of negative electrodes 3 according to their position within the stack.

The thickness of the layers of active material of the electrodes of the same polarity (anode or cathode) is also adapted according to their position within the stack, the smallest thickness being that of the electrodes in the center of the stack, with the exception of the thickness of the layers of electrodes having the higher porosity.

Thus at least two groups of electrodes of different thicknesses are provided, with the smallest thickness in the core (center) of the stack, with the exception of the most porous layers.

In the following example, the metal foils of square or rectangular section supporting the active insertion material of the electrodes may have a thickness of between 5 and 50 μm.

An anode foil 3 may advantageously be a copper foil with a thickness of about 12 μm.

A cathode foil 2 may advantageously be an aluminum foil with a thickness of about 20 μm.

The positive 2 or negative 3 electrodes according to the invention comprise, as usual, a lateral metal strip or edge which is free of active insertion material, and a central portion which supports a continuous layer of active insertion material over its whole length.

In a stack according to the invention, for the purpose of designing the amounts of energy facing one another, the parameters that may vary as a function of the nature of the electrode materials used are as follows:

a/the density of the active insertion materials,
b/the weight per unit area of the layers of active material deposited,
c/the thickness of the electrodes,
d/the porosity of the electrodes.

As a general rule, the thicknesses of the positive electrodes are not usually equal to those of the negative electrodes facing them in the same stack. This is because, as specified above, the thicknesses depend on the nature of the insertion materials used and the facing energy densities and the power required, the parameters a/, b/, c/, and d/usually differing between the positive and negative electrodes.

An example of an embodiment of a Li-ion accumulator will now be described, consisting of a stack of positive electrodes 2 and negative electrodes 3 with at least two different values of porosity of these negative electrodes 3 in the stack, according to the invention.

In this example, the thicknesses of the active layers of the negative and positive electrodes increase in an identical manner from the core (center) of the stack toward its ends, with the exception of the active layer of the more porous negative electrodes in the center of the stack.

Figure 12:
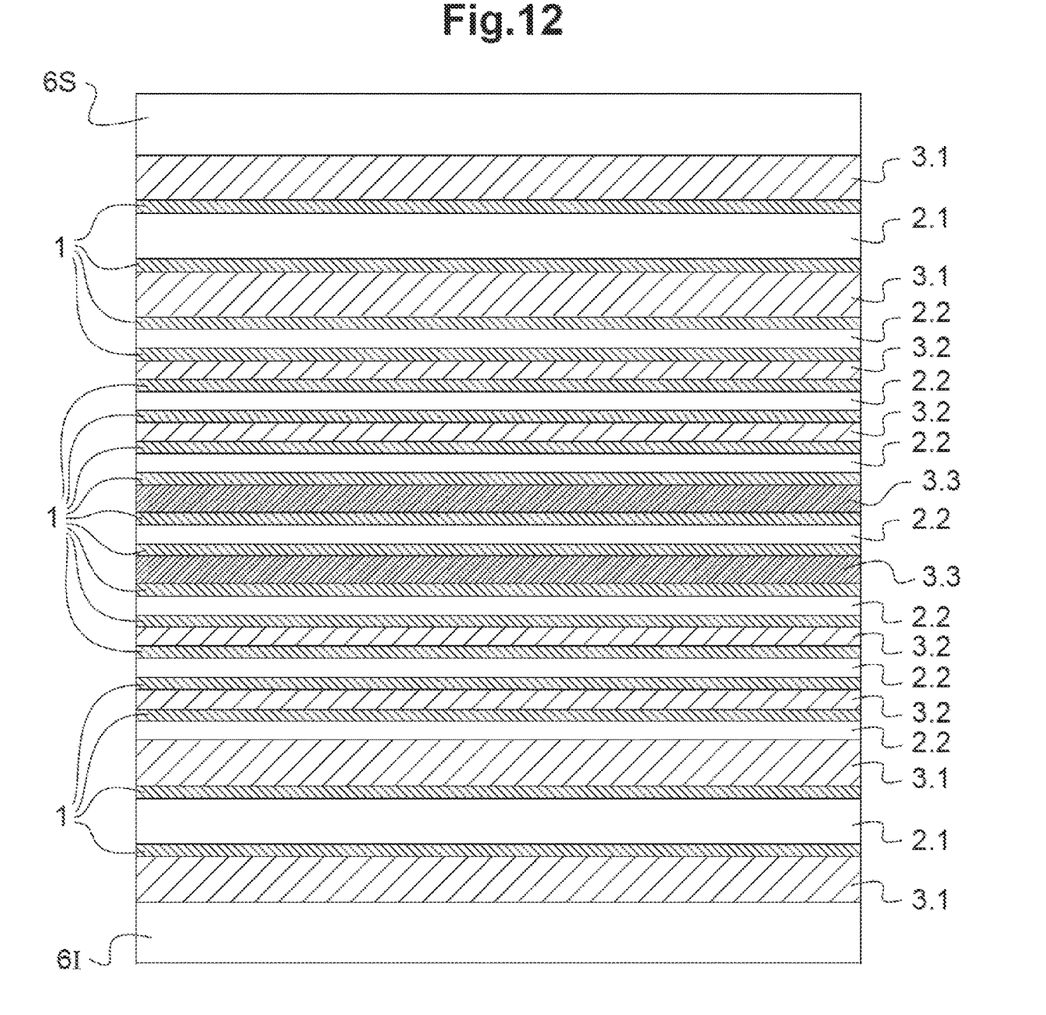
FIG. 12 is a cross-sectional view of an example of a stack of electrodes in a prismatic accumulator according to the invention.

Additionally, as shown expressly in FIG. 12, the stack of electrodes in the total thickness of the accumulator is symmetrical between the top face 6S and the bottom face 61 of the stacking, formed by the faces of the shell 6.

This symmetry provides uniformity in the discharge of energy generated by the Joule effect. In other words, heat dissipation can take place in an equivalent manner on the two main faces of the prismatic accumulator.

In this example, the positive electrodes 2 each have a layer of active insertion material based on $LiFePO_4$, with a total theoretical capacity of 160 to 165 mAh/g, while the active layers of the negative electrodes are based on graphite, with a total theoretical capacity of 390 to 400 mAh/g.

A stack of electrodes is formed with two different levels of porosity for the negative electrodes, two different levels of thickness for the positive electrodes, and three different levels of thickness for the negative electrodes. This example is shown in FIG. 12.

The total thickness and the weight per unit area of the negative electrodes at the ends of the stack, i.e. electrodes 3.1, are greater than those of the adjacent electrodes, i.e. electrodes 3.2, in the core of the stack, with the exception of the negative electrodes 3.3 with higher porosity.

The same applies to the total thicknesses and weights per unit area of the active layers of the positive electrodes, the smallest total thicknesses and weights per unit area being those of the positive electrodes 2.2 in the center, and the greatest thicknesses and weights per unit area being those of the positive electrodes 2.1 at the ends of the stack.

The characteristics of the active layers of the different electrodes in this example are shown in Table 3 below.

It should be noted here that the value of porosity, weight per unit area and total thickness of each electrode is a mean value.

TABLE 3

| Types of electrodes according to their position in the stack | Weight per unit area of the layer of active electrode material (mg/cm$^2$/ face of the foil) | Total thickness of the electrode (μm (microns)) | Porosity of the layer of active electrode material (%) |
|---|---|---|---|
| Negative electrode 3.1 | 11.0 | 170 | 30 to 36 |
| Positive electrode 2.1 | 25.0 | 265 | 33 to 39 |
| Negative electrode 3.2 | 9.0 | 140 | 30 to 36 |
| Positive electrode 2.2 | 20.0 | 215 | 33 to 39 |
| Negative electrode 3.3 | 9.0 | 160 | 39 to 45 |

Other variants and improvements may be provided without departure from the scope of the invention.

Thus it would be feasible to have different variants of levels of porosity and thickness and graduation of thickness for each level.

The invention is not limited to the examples described above; notably, characteristics of the illustrated examples may be combined with one another in variants which have not been illustrated.

An electrode according to the invention may be formed regardless of the active material and the electrode components (collector, binders, electronic conductors, additives).

The stacking steps are those usually carried out to form a stacked metal-ion accumulator.

In all the illustrated examples, the thicknesses of layers of active insertion materials are formed on both faces of the foil of the same given electrode. Evidently, the invention is also applicable to a stack having some layers of active material which are coated on only one of the two faces of the foil. This may relate mainly to the two electrodes located at the upper and lower ends of the stack.

In all the illustrated examples, the positive electrodes all have the same porosity and the negative electrodes have different polarities within the same accumulator. This configuration is preferable because the aim is to maximize the energy density per unit volume within the accumulator. A priori, therefore, the porosity of the positive electrodes should be as low as possible in order to obtain optimal performance.

This being said, it would also be feasible to have positive electrodes with different porosities, with those of higher porosity in the center of the accumulator stack and those of lower porosity at the ends of the stack. In this configuration, however, a negative electrode of higher porosity, intercalated in the center of the stack, is retained.

REFERENCES CITED

[1]: *Thermal Characterization of Advanced Lithium Ion Polymer Cells*, Third Advanced Automotive Battery Conference, June 2003.

[2]: *Evaluation Study for Large Prismatic Lithium-Ion Cell Designs Using Multi-Scale Multi-Dimensional Battery Model*, Gi-Heon Kim and Kandler Smith, E C S, 2004.

The invention claimed is:

1. A metal-ion accumulator, comprising a stack of elementary electrochemical cells, each comprising a cathode which is an electrode of positive polarity, an anode which is an electrode of negative polarity, and a separator impregnated with electrolyte intercalated between the anode and the cathode, each anode and cathode consisting of a substrate formed from a metal foil comprising a central portion supporting, on at least one of its main faces, a layer of active metal ion insertion material, the porosity of the layers of active material of the cathodes or the anodes having at least two different values in the stack, at least one of the cathodes or the anodes having the highest porosity being arranged between the center and the ends of the stack.

2. The metal-ion accumulator according to claim 1, wherein the lowest porosity of the layers of active material of the anodes is between 28% and 36%, while the highest porosity is between 37% and 45%.

3. The metal-ion accumulator according to claim 1, wherein the lowest porosity of the layers of active material of the cathodes is between 21% and 31%, while the highest porosity is between 32% and 42%.

4. The metal-ion accumulator according to claim 1, wherein the thickness of the layers of active material of the cathodes or the anodes has at least two different values within the stack, and wherein the cathodes or the anodes having the smallest thickness are in the center of the stack, with the exception of the at least one of the cathodes or the anodes having the higher porosity.

5. The metal-ion accumulator according to claim 1, wherein the at least one of the cathodes or the anodes having the highest porosity are anodes.

6. The metal-ion accumulator according to claim 1, wherein the variation in thickness of the anodes between the center and the ends of the stack is between 20 and 200 μm.

7. The metal-ion accumulator according to claim 1, wherein the variation in thickness of the cathodes between the center and the ends of the stack is between 20 and 200 μm.

8. The metal-ion accumulator according to claim 1, wherein the layer of active material of the anodes at the end of the stack has a thickness of more than 150 μm.

9. The metal-ion accumulator according to claim 1, wherein the layers of active material of the anodes in the center of the stack, with the exception of the layer of active material of the at least one of the cathodes or the anodes of higher porosity, have a thickness of less than 150 µm.

10. The metal-ion accumulator according to claim 1, wherein the layer of active material of the cathodes at the end of the stack has a thickness of more than 225 µm.

11. The metal-ion accumulator according to claim 1, wherein the layer of active material of the cathodes in the center of the stack has a thickness of less than 225 µm.

12. The metal-ion accumulator according to claim 1, wherein the metal foil has a thickness of between 10 and 20 µm.

13. The metal-ion accumulator according to claim 1, wherein the metal foil is made of aluminum or copper.

14. The metal-ion accumulator according to claim 1, further comprising:
- a first and a second group of anodes of lower porosity, the thickness of the layers of active material of the first group of anodes being different from the thickness of the layers of active material of the second group of anodes;
- a first and a second group of cathodes of lower porosity, the thickness of the layers of active material of the first group of cathodes being different from the thickness of the layers of active material of the second group of cathodes; and
- a group of cathodes or of anodes of higher porosity;

wherein the first group of anodes of lower porosity and the first group of cathodes of lower porosity are arranged at the ends of the stack, and the second group of anodes of lower porosity and the second group of cathodes of lower porosity are arranged in the center of the stack, and wherein at least one cathode or anode of the group of cathodes or anodes of higher porosity is intercalated between the second group of negative electrodes of lower porosity and the second group of positive electrodes of lower porosity.

15. A method of applying power, comprising using the accumulator according to claim 1 to deliver current rates between 2 C and 5 C.

16. The metal-ion accumulator according to claim 1, further comprising a flexible shell or a rigid casing in which the stack is housed.

17. The metal-ion accumulator according to claim 16, wherein:
- the casing is aluminum-based;
- metal foil of the anodes is made of copper;
- the active insertion material of the anodes is chosen from the group comprising graphite, lithium, and titanate oxide $Li_4Ti_5O_{12}$; or is based on silicon or lithium, or based on tin and alloys thereof;
- metal foil of the cathodes is made of aluminum;
- the active insertion material of the cathodes is chosen from the group comprising lithium iron phosphate $LiFePO_4$, lithium cobalt oxide $LiCoO_2$, lithium manganese oxide, substituted if necessary, $LiMn_2O_4$, or a material based on $LiNi_xMn_yCo_zO_2$ where $x+y+z=1$, such as $LiNi_{0.33}Mn_{0.33}C_{0.33}O_2$, or a material based on $Li_xNiCo_yAl_zO_2$ where $x+y+z=1$, $LiMn_2O_4$, $LiNiMnCoO_2$ or lithium nickel cobalt aluminum oxide $LiNiCoAlO_2$.

* * * * *